(12) United States Patent
Migliarini et al.

(10) Patent No.: US 7,196,129 B2
(45) Date of Patent: Mar. 27, 2007

(54) VULCANIZING SYSTEM, RUBBER COMPOSITION INCLUDING THE VULCANIZING SYSTEM, TREAD FOR A VEHICLE TIRE INCLUDING THE RUBBER COMPOSITION, AND TIRE INCLUDING THE TREAD

(75) Inventors: Luigi Migliarini, Monza (IT); Cristiano Bette', Milan (IT); Fabio Negroni, Galliate (IT)

(73) Assignee: Pirelli Pneumatici S.p.A., Milan (IT)

( * ) Notice: Subject to any disclaimer, the term of this patent is extended or adjusted under 35 U.S.C. 154(b) by 208 days.

(21) Appl. No.: 09/884,060

(22) Filed: Jun. 20, 2001

(65) Prior Publication Data
US 2002/0042465 A1    Apr. 11, 2002

Related U.S. Application Data

(63) Continuation of application No. PCT/EP99/10190, filed on Dec. 20, 1999.

(60) Provisional application No. 60/114,256, filed on Dec. 28, 1998.

(30) Foreign Application Priority Data
Dec. 22, 1998  (EP) .................................. 98204414

(51) Int. Cl.
*C08K 3/04*       (2006.01)
(52) U.S. Cl. ........................ 524/432; 524/492; 524/495
(58) Field of Classification Search ................ 524/492, 524/495, 432
See application file for complete search history.

(56) References Cited

U.S. PATENT DOCUMENTS 4,861,842 A    8/1989   Cohen et al.

FOREIGN PATENT DOCUMENTS

| DE | 1 069 376    | 11/1959 |
| EP | 0 728 807 A1 | 8/1996  |
| EP | 0 763 558 A1 | 3/1997  |
| EP | 0 802 223 A2 | 10/1997 |
| JP | 7-109381     | 4/1995  |
| JP | 7-109382     | 4/1995  |
| JP | 7-109383     | 4/1995  |

OTHER PUBLICATIONS

A.A. Mukhitdinov et al., "Possibility of Reducing the Amount of Zinc Oxide in Rubber Mix Formulations", International Polymer Science and Technology, 21, No. 7, pp. 48-51, (1994).

*Primary Examiner*—Edward J. Cain
(74) *Attorney, Agent, or Firm*—Finnegan, Henderson, Farabow, Garrett & Dunner, L.L.P.

(57) ABSTRACT

A tire for vehicles includes a tread having a vulcanized polymeric base including at least one reinforcing filler dispersed in the polymeric base; an amount of extractable residue of at least one vulcanization accelerator, containing at least one carbon atom bound to at least two sulfur atoms, from 0.5% to 1.8% by weight based on a total weight of the tread; an amount of at least one activator, expressed as equivalents of zinc oxide, not higher than 2% by weight based on the total weight of the tread; and an amount of combined sulfur lower than 2.5% by weight based on the total weight of the tread. A tread for vehicle tires, a vulcanizable rubber composition for the manufacture of such a tread, and a vulcanizing system, all related to the tire for vehicles, are also disclosed.

20 Claims, 1 Drawing Sheet

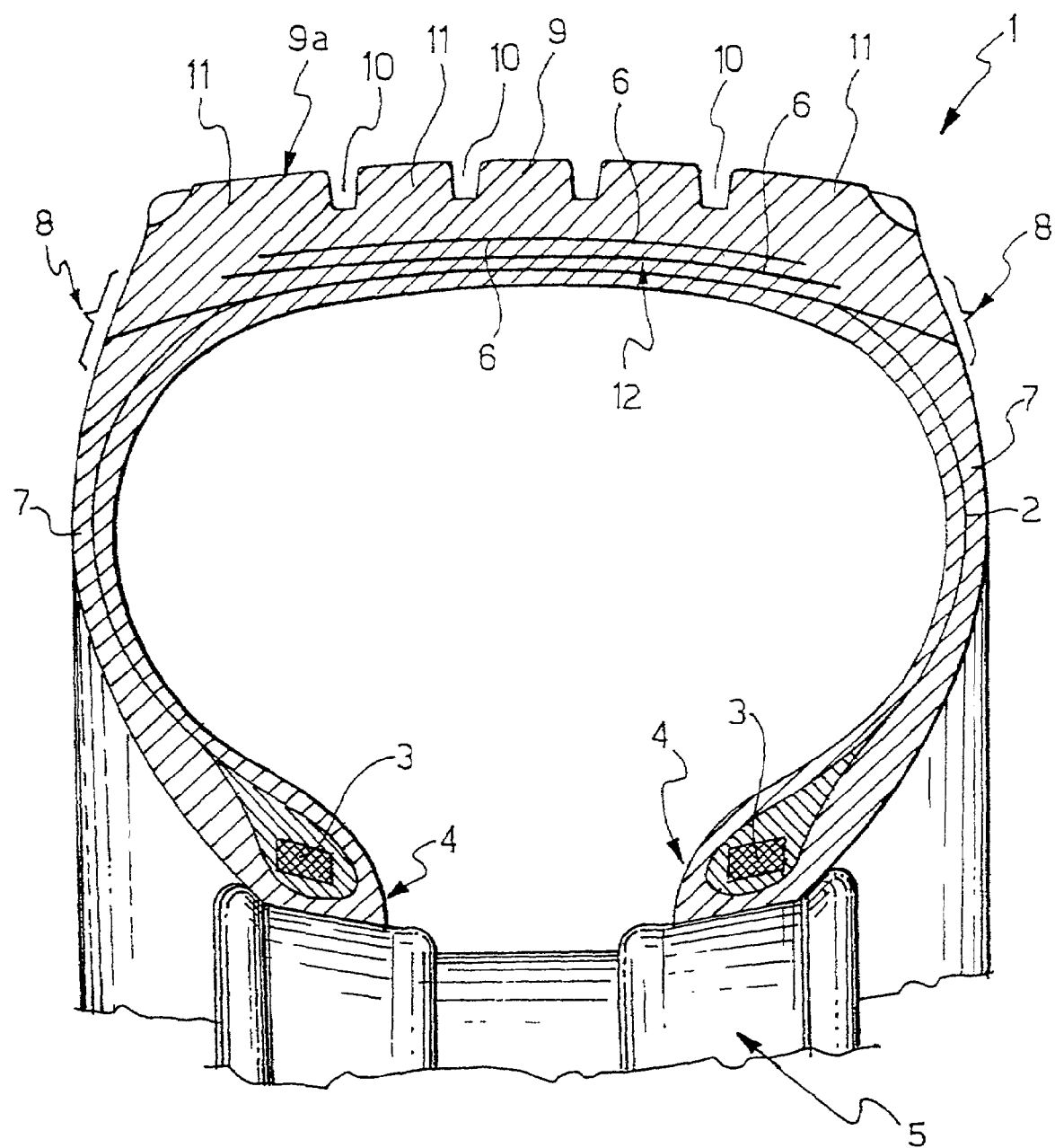

VULCANIZING SYSTEM, RUBBER COMPOSITION INCLUDING THE VULCANIZING SYSTEM, TREAD FOR A VEHICLE TIRE INCLUDING THE RUBBER COMPOSITION, AND TIRE INCLUDING THE TREAD

CROSS-REFERENCES TO RELATED APPLICATIONS

This application is a continuation of International Patent Application No. PCT/EP99/10190, filed Dec. 20, 1999, in the European Patent Office; additionally, Applicants claim the right of priority under 35 U.S.C. § 119(a)–(d) based on patent application No. 98204414.1, filed Dec. 22, 1998, in the European Patent Office; further, Applicants claim the benefit under 35 U.S.C. § 119(e) based on prior-filed, now abandoned provisional application No. 60/114,256, filed Dec. 28, 1998, in the U.S. Patent and Trademark Office; the contents of all of which are relied upon and incorporated herein by reference.

BACKGROUND OF THE INVENTION

1. Field of the Invention

The present invention relates to a vehicle tire, in particular while not exclusively, for cars and light trucks, provided with a high wear-resistance tread.

The invention also relates to said tread, as well as to a vulcanizable rubber composition of the type comprising a cross-linkable unsaturated chain polymeric base, and to a sulfur-based vulcanizing system.

In the following description and in the subsequent claims, the terms: cross-linkable unsaturated chain polymeric base, are used to indicate any non cross-linked polymer or polymer blend, either natural or synthetic, capable of assuming all the physical-chemical and mechanical characteristics typical of elastomers as a result of cross-linking (vulcanization) with sulfur-based systems.

2. Description of the Related Art

In the field of vehicle tire manufacturing, one of the more difficult objects to be reached has always been that of increasing the wear resistance of the tire, achieving at the same time a satisfactory skid resistance on wet road.

The difficulties for achieving the aforementioned object have been worsened in recent times by the need of satisfying at the same time also a third parameter, namely, a reduced rolling resistance, which is at present strongly required by the tire market, which further complicates the problem of achieving a satisfactory compromise between all of the aforementioned parameters.

Generally, a low rolling resistance is achieved by using in the rubber composition of the tread the so-called light reinforcing fillers (first of all silica) , a lower amount of carbon black, a suitable amount of carbon black having a reduced surface area and being, as such, less reinforcing, or a combination of two or more of the aforementioned measures.

Among the formulation criteria for the rubber compositions of the treads usually adopted in the art in order to increase the wear resistance of the tire, it is possible to mention the use of polybutadiene in the polymeric base of the rubber composition or the use of more reinforcing fillers and/or greater amounts of the same.

However, in both cases, a worsening in other properties of the tire, such as wet skid resistance in the first case, and rolling resistance in the second case, is observed.

In order to increase the wear resistance of the tire tread to be used in heavy vehicles, it was also proposed to introduce specific thermosetting resins in the polymeric base, such as for instance m-cresol-formaldehyde or phenol resins, as is described in Japanese patent applications JP 7-109381, JP7-109382 and JP7-109383.

However, in so doing, a greater rigidity of the tread at low temperature, and a higher energy dissipation due to hysteresis with a possible increase in rolling resistance were observed.

SUMMARY OF THE INVENTION

The technical problem underlying the present invention is therefore that of devising and providing a tire that, while having an improved wear resistance, keeps substantially unaltered its characteristics of wet skid resistance and rolling resistance.

According to the invention, the aforementioned problem is solved by a tire for vehicles comprising a tread comprising a vulcanized polymeric base including:

a) at least one reinforcing filler dispersed in said polymeric base, b) an amount of extractable residue of at least one vulcanization accelerator containing at least one carbon atom bound to at least two sulfur atoms between 0.5 and 1.8% by weight based on the total weight of the tread;

c) an amount of at least one activator, expressed as equivalents of zinc oxide, not greater than 2% by weight based on the total weight of the tread;

d) an amount of combined sulfur lower than 2.5% by weight based on the total weight of the tread.

In the following description and the subsequent claims, the terms: extractable residue of at least one vulcanization accelerator, are used to indicate the by-products deriving from the in situ reaction of the accelerator and which are not irreversibly bound to the vulcanized polymeric matrix. Such by-products may be chemically extracted from the vulcanized rubber composition, for instance by means of suitable solvents. The extractable residue so obtained may be analyzed with respect to both quality and quantity by means of analytical methods known per se, such as for instance high pressure liquid phase chromatography (HPLC).

In the following description and the subsequent claims, the terms: equivalents of zinc oxide, are used to indicate the parts by weight of activator having an effectiveness substantially identical to one part by weight of zinc oxide, the vulcanization conditions being equal.

In the following description and the subsequent claims, the terms: combined sulfur, are used to indicate the sulfur that has actually contributed to the formation of the vulcanization network, i.e., the sulfur that is present in the cross links formed between the various polymeric chains. Conveniently, the combined sulfur may be detected by means of analytical methods known per se, for instance by extraction with acetone, according to ASTM D 297 standards.

According to the invention, it has surprisingly been found that the desired improvement in wear resistance may be achieved without affecting neither the wet skid resistance, nor the rolling resistance, when the tread has—once vulcanized—the aforementioned combination of characteristics, and in particular:

i) a high amount of an extractable residue of at least one vulcanization accelerator containing at least one carbon atom bound to at least two sulfur atoms, i.e., it is obtained starting from a rubber composition containing a high amount—typically between 4 and 7 phr—of at least one vulcanization accelerator;

ii) a reduced amount of activator;
iii) a reduced amount of combined sulfur.

Very surprisingly, the tires of the invention, road-tested and compared with entirely equal tires but incorporating a tread according to the prior art, have achieved—the formulation of the polymeric base being equal—a clearly higher wear resistance, while keeping substantially unaltered the values of rolling resistance and wet skid resistance.

According to the invention, it has unexpectedly been observed that such advantageous results can be achieved when the tire tread includes an amount of activator lower than the minimum amount, and an amount of extractable residue of the vulcanization accelerator higher than the maximum amount that the prior art in this field suggests to use for the manufacture of treads having an improved wear resistance.

So, for instance, Japanese patent applications JP7-109381, JP7-109382 and JP7-109383 mentioned above disclose rubber compositions for treads wherein the minimum amount of activator in the vulcanizing system is not lower than 3 phr, while the maximum amount of vulcanization accelerator is in the order of 1 phr, thus obtaining in the vulcanized rubber composition a markedly lower amount of extractable residue of accelerator and a markedly higher amount of activator in terms of zinc oxide equivalents than those detectable in the tire tread of the invention.

Advantageously, a tire provided with a tread having the aforementioned characteristics, achieves the aforesaid unexpected improvement of its wear resistance, in all the severity use conditions of the tire (high, medium, low).

The invention also allows to limit the problems related to the use of polybutadiene, indicated by the prior art as an ingredient capable of improving the wear resistance of the tread and whose amount may be reduced and in some instances eliminated, such as for instance the difficulty of homogeneously disperse such polymer in the polymeric base, and especially the worsening of wet skid resistance.

Finally, the tires of the invention can advantageously allow to obtain optimum performances both in terms of tear resistance and in terms of resistance to the "chunking" phenomenon of the tread also in the so-called "borderline" use conditions.

For the purposes of the invention, the cross-linkable unsaturated chain polymeric base of preferred use comprises all the polymers commonly used in the tire field for manufacturing the tread.

Preferably, the polymeric base comprises at least one polymer selected from the group comprising: natural rubber, polybutadiene, polychloroprene, polyisoprene, optionally halogenated isoprene-isobutene copolymers, butadiene-acrylonitrile copolymers, copolymers obtainable by polymerization of at least one conjugated diene with at least one vinyl aromatic hydrocarbon, optionally halogenated isobutylene/p-methyl styrene copolymers, styrene-butadiene-isoprene terpolymers, obtained either in solution and in emulsion, ethylene-propylene-diene terpolymers, and mixtures thereof.

Among the polymeric bases useful for the purposes of the invention, those wherein said conjugated diene is selected from the group comprising 1,3-butadiene, isoprene, 2,3-dimethyl-1,3-butadiene, 1,3-pentadiene, 1,3 hexadiene, and mixtures thereof, are particularly preferred.

Besides, for the purposes of the invention, said vinyl aromatic hydrocarbon is preferably selected from the group comprising: styrene, αmethyl-styrene, p-methyl-styrene, vinyl-toluene, vinyl-naphthalene, vinyl-pyridine, and mixtures thereof.

Preferably, the polymeric base of the invention comprises at least 30 parts by weight based on 100 parts by weight of the same (phr) of a styrene-butadiene copolymer.

As illustrated above, the surprising characteristics of wear resistance obtainable by the tire of the invention may be attributed to the particular and specific combination of ingredients of the tread, in particular to the amount and the kind of accelerator, to the amount of vulcanization activator and to the amount of combined sulfur.

For the purposes of the invention, the vulcanization accelerator comprises at least one carbon atoms bound to at least two sulfur atoms or the S-C-S group, and is preferably selected from the accelerators including at least one 2-benzothiazole or sulphenamide group.

Among them, the thiazole accelerators of preferred use are those comprised in the class of the so-called fast accelerators or semi-ultra accelerators, having the following structural formula:

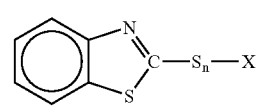

(I)

wherein n is an integer of from 1 to 5 and X is H or a group selected from:

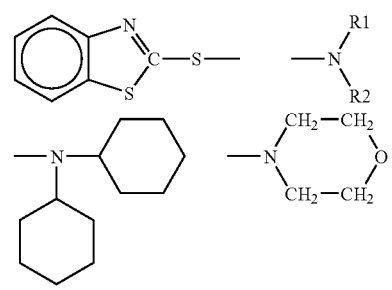

wherein R1 and R2 are independently H, an alkyl group, a saturated ring optionally comprising C, S, or O, a cycloalkyl group having 5 or 6 carbon atoms or a group

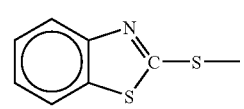

Particularly effective fast accelerators were found to be those selected from the group comprising: 2-mercaptobenzothiazole (MBT), dibenzothiazyl disulphide (MBTS), N-cyclohexyl-2-benzothiazyl-sulphenamide (CBS), N-tert-.butyl-2-benzothiazyl sulphenamide (TBBS), 2-morpholinthia-2-benzothiazole (MBS), N-dicyclohexyl-2-benzothiazyl sulphenamide (DCBS), benzothiazyl-2-diisopropyl sulphenamide (DIBS), benzothiazyl-2-tert.amyl sulphenamide (AMZ), morpholin-thiocarbonyl sulphenmorpholine (OTOS), N-tert.butyl-2-benzothiazol sulphenamide (TBSI), and mixtures thereof.

The amount of extractable residue of the vulcanization accelerator may be detected in the tire tread by techniques and analysis apparatuses known per se.

So, for instance, the amount of extractable residue of a vulcanization accelerator including at least one 2-mercaptobenzothiazole group may be determined by high pressure liquid phase chromatography (HPLC) by which it is possible to determine the by-product of the accelerator used in the starting rubber composition and which is not irreversibly bound to the polymeric matrix as a result of the vulcanization reaction.

Preferably, in the tire of the invention the weight ratio between the extractable residue of the vulcanization accelerator and the amount of activator, expressed in terms of zinc oxide equivalents, is not higher than 10 and, still more preferably, of from 3 to 8.

Preferably, further, in the tire of the invention the weight ratio between the combined sulfur and the extractable residue of the vulcanization accelerator is of from 1.2 to 2.8 and, still more preferably, of from 1.7 to 2.5.

For the purposes of the invention, the activator is preferably selected from the group comprising: the oxygenated compounds of a metal selected from Zn, Bi, Pb, the salts formed between said metal and a fatty acid, either saturated or unsaturated, having from 8 to 18 carbon atoms, and mixtures thereof.

Zinc compounds were found to be particularly effective activators and in particular ZnO, $ZnCO_3$, zinc salts of fatty acids, either saturated or unsaturated, having from 8 to 18 carbon atoms, such as for instance zinc stearate, preferably formed in situ in the rubber composition starting from ZnO and a fatty acid, as well as BiO, PbO, $Pb_3O_4$, $PbO_2$, and mixtures thereof.

For the purposes of the invention, the amount of activator expressed in terms of zinc oxide equivalents, is lower than 2% by weight, preferably of from 0.5 to 1.5% by weight, and still more preferably it does not exceed 0.6% by weight based on the total weight of the tread.

The amount of activator may be detected in the tire tread by means of techniques and analysis apparatuses known per se, such as for instance those described in ISO 6101/1 standard.

As said above, the amount of combined sulfur present in the vulcanized polymeric base of the tire tread according to the invention is lower than 2.5%, and preferably of from 0.5 to 1.5% based on the total weight of the tread.

The amount of combined sulfur may be detected in the tire tread by means of techniques and analysis apparatuses known per se, such as for instance the combustion in oxygen after extraction with acetone, according to the techniques described in ASTM D 297 standard.

In order to achieve the desired mechanical and hysteretic characteristics, the tire tread comprises at least one reinforcing filler selected among the usual carbon black-based and/or silica-based fillers.

In the following description and the subsequent claims, the terms: silica-based reinforcing filler, is used to indicate a reinforcing agent based on amorphous silica, silicates, and mixtures thereof.

With the only purpose of simplifying the present description, the silica-based fillers of the invention will be indicated in the following by the term: silica.

The tire tread of the invention may comprise from 0 to 100 phr of carbon black-based reinforcing filler and from 0 to 100 phr of silica-based reinforcing filler (data referred to the starting rubber composition).

If the tread only comprises carbon black as a reinforcing filler, the incorporation of from 40 to 100 phr of carbon black is particularly advantageous.

If the tread only comprises silica as a reinforcing filler, the incorporation of from 40 to 100 phr of silica is particularly advantageous.

If the tread comprises both carbon black and silica as reinforcing fillers, the incorporation of from 5 to 80 phr of carbon black and of from 15 to 90 phr of silica is particularly advantageous.

The carbon black-based reinforcing fillers which may be used in the tire tread of the invention are those conventionally employed in the art for use in tire treads and comprise, for instance, the carbon blacks indicated according to ASTM standards by the designations N110, N121, N134, N220, N231, N234, N299, N330, N339, N347, N351, N358 and N375.

The silica-based reinforcing fillers which may be used in the tire tread of the invention are those conventionally used in the art; preferably, the silica of most advantageous use is precipitated silica having a surface area, measured according to the BET method, of from 100 to 300 $m^2/g$.

If a silica-based reinforcing filler, either with or without carbon black, is used, the rubber composition employed for manufacturing the tire tread of the invention preferably incorporates a suitable coupling agent capable of interacting with silica and bind the latter to the polymeric base during the vulcanization of the same.

Coupling agents of preferred use are silane-based known in the art and used in amounts that may be easily determined by those skilled in the art.

Among them, the silane-based binder bis(3-triethoxysilylpropyl)tetrasulphide or TESPT, marketed by Degussa under the name of Si69, as such or in a suitable mixture with a low amount of an inert filler (for instance carbon black or the same silica), in order to facilitate its incorporation in the rubber composition, is particularly preferred. In this case the silane-based binder is marketed under the name of X50S (50% carbon black, 50% silane).

According to a further aspect of the invention, a tread for vehicle tires is provided, in particular a premolded tread for covering worn tires, having an improved wear resistance, a good wet skid resistance and optionally a low rolling resistance, comprising a vulcanized polymeric base comprising:
  a) at least one reinforcing filler dispersed in said polymeric base,
  b) an amount of extractable residue of at least one vulcanization accelerator containing at least one carbon atom bound to at least two sulfur atoms of from 0.5 to 1.8% by weight based on the total weight of the tread;
  c) an amount of at least one activator, expressed as equivalents of zinc oxide, not higher than 2% by weight based on the total weight of the tread;
  d) an amount of combined sulfur lower than 2.5% by weight based on the total weight of the tread.

For the purposes of the invention, such tread comprises the ingredients and has the characteristics described above with reference to the tire according to the present invention.

Preferably, the tread of the invention is obtained by drawing, molding or calendering at a temperature of from 80 to 120° C.

Advantageously, the tread—once vulcanized by means of operations known per se—has both an improved wear resistance compared to a tread of known type, and hysteretic characteristics such as to allow a satisfactory wet skid resistance and, in the presence of a silica-based reinforcing filler, also reduced rolling resistance values.

As proved by laboratory tests carried out by the Applicant and as will be more readily apparent in the following description, the abradibility of a tread according to the invention is of from 20% to 80% lower than the abradibility measured on a tire tread of known type for the same type of application.

According to a further aspect of the invention, a vulcanizable rubber composition for the manufacture of a tread for vehicle tires is provided, comprising:
  a) a cross-linkable unsaturated chain polymeric base;
  b) a vulcanizing system comprising:
    b1) an amount of sulfur of from 0.5 to 2 phr;
    b2) an amount of from 1.5 to 7 phr of at least one vulcanization accelerator containing at least one carbon atom bound to at least two sulfur atoms;
    b3) an amount not higher than 2 phr, expressed in terms of zinc oxide equivalents, of at least one activator.

In the following description and the subsequent claims, the values expressed in phr refer to the parts by weight of the specific ingredient based on 100 parts by weight of polymeric base.

For the purposes of the invention, such rubber composition comprises the ingredients described above with reference to the tire and the tread according to the present invention.

In this case, the amounts of the ingredients are expressed in phr and correspond to those identifiable in the vulcanized tread indicated above, with the proviso that the data on combined sulfur must be referred, in the case of the rubber composition, to sulfur introduced as such, and provided by the vulcanizing system.

For the purposes of the invention, the amount of accelerator is of from 1.5 to 7 phr, preferably of from 2.5 to 6 phr and still more preferably of from 3 to 5 phr.

Preferably, and provided that the accelerator includes at least one 2-benzothiazole group, the weigh ratio between the total amount of said group and the amount of the activator expressed in terms of zinc oxide equivalents, is not higher than 10 and, still more preferably, of from 3 to 8.

For the purposes of the invention, the sulfur of the vulcanizing system according to the invention may be provided by elementary sulfur or at least one of the sulfur donors known in the art.

Preferably, the sulfur donor is selected from the group comprising: dithiobismorpholine, dithiobiscaprolactame, dipentamethylene thiuram tetrasulphide, dialkyldithiophosphate polysulphide, bis-triethoxysilylpropyl polysulphide, alkylphenoldisulphides, and mixtures thereof.

Preferably, besides, the weight ratio between the sulfur of the vulcanizing system and the vulcanization accelerator is of from 0.16 (0.8/5) to 0.48 (1.2/2.5).

In an embodiment of the invention, the rubber composition may further comprise at least one secondary vulcanization accelerator preferably selected from the class of the so-called very fast accelerators or ultra accelerators, among which diphenylguanidines, dithiocarbamates, thiurams, and mixtures thereof.

Particularly effective very fast accelerators are those selected from the group comprising zinc, bismuth, cadmium, lead, copper, selenium, tellurium and iron dithiocarbamates.

Among them, very fast accelerators of preferred use are those selected from the group comprising: zinc dimethyl dithiocarbamate (ZDMC), zinc diethyl dithiocarbamate (ZDEC), zinc dibutyl dithiocarbamate (ZDBC), zinc ethylphenyl dithiocarbamate (ZEPC), zinc dibenzyl dithiocarbamate (ZBEC), and mixtures thereof.

Additional very fast accelerators of preferred use are those selected from the group comprising: diphenyl guanidine (DPG), tetramethylthiuram disulphide (TMTD), tetramethylthiuram monosulphide (TMTM), dimethyl diphenyl thiuram disulphide, and mixtures thereof.

Advantageously, said secondary vulcanization accelerators allow to modify as desired the kinetics of vulcanization, optimizing the production times.

To this aim, the secondary vulcanization accelerators are used according to methods and amounts that can be easily determined by those skilled in the art.

In relation to the use of vulcanization accelerators in the production and subsequent vulcanization of the tire of the invention, the Applicant has surprisingly found that the use of accelerators free from sulphenamino groups, such as for instance dibenzothiazyl disulphide (MBTS), in a polymeric base including butadiene-styrene copolymers obtained in solution (S-SBR) and silica, allows to reduce the vulcanization times, reducing at the same time the problems of premature vulcanization ("scorching") which are observed in the similar formulation rubber composition of the known art.

Besides, in this embodiment of the invention, it is also possible to reduce or eliminate the secondary accelerators, such as for instance diphenyl guanidine (DPG), achieving both a better reproducibility of the process for producing the rubber composition and a greater uniformity of the rubber compositions thus produced.

In addition to the above described ingredients, the rubber composition used for manufacturing the tire tread of the invention may incorporate one or more non cross-linking ingredients, known per se, necessary to impart the desired mechanical and processing characteristics to the rubber composition.

Such ingredients are in particular selected from the group comprising plasticizers, processing adjuvants, antioxidants, antiageing agents, etc.

Besides, each of such ingredients is selected in the amount and proportions that can be easily determined by those skilled in the art.

The aforesaid rubber composition may be obtained by means of mixing operations conventional per se and well known to those skilled in the art, which will be not described herein in detail.

According to a further aspect of the invention, a vulcanizing system is provided capable of increasing the wear resistance of an article obtainable by vulcanizing a rubber composition comprising a cross-linkable unsaturated chain polymeric base, in particular a rubber composition suitable for the manufacture of a tread for vehicle tires, including:
  a) an amount of sulfur of from 0.5 to 2 phr;
  b) an amount of from 1.5 to 7 phr of at least one vulcanization accelerator containing at least one carbon atom bound to at least two sulfur atoms;
  c) an amount not higher than 2 phr, expressed in terms of zinc oxide equivalents, of at least one activator.

For the purposes of the invention and similarly to what has been illustrated above with reference to the rubber composition, said vulcanizing system comprises the ingredients and the characteristics disclosed above with reference to the tire and the tread according to the present invention. With respect to the amounts of the ingredients and their ratios, no significant deviations are found from those previously indicated with reference to the rubber composition.

Very surprisingly, the vulcanizing system of the invention has allowed to obtain—using the same formulation of the polymeric base as Known rubber compositions—an improved wear resistance of the rubber composition after vulcanization.

In case of a tread for vehicle tires, the vulcanizing system of the invention has also allowed to achieve such result without substantially affecting the rolling resistance and wet skid resistance values.

According to a further aspect of the invention, a process is provided for the manufacture of a tire for vehicle wheels comprising the steps of preparing around the circumference of a belt structure the above described tread and of linking by vulcanization said tread to said belt structure.

According to a further aspect of the invention, a process is provided for covering worn tire for vehicle wheels, comprising the steps of preparing around the circumference of a belt structure the above described tread and of irreversibly linking said tread to said belt structure.

According to a further aspect of the invention, lastly, a method is provided for increasing the wear resistance of a tire, said tire being provided with at least one carcass ply on which a belt structure is circumferentially applied, and with a tread circumferentially applied on said belt structure and externally provided with a rolling surface suitable to get in touch with the ground, which method is characterized in that the tire is provided with the tread described above.

BRIEF DESCRIPTION OF THE DRAWINGS

Additional characteristics and advantages of the invention will be more readily apparent from the following description of some examples of tires, treads and vulcanizable rubber compositions according to the invention—made solely by way of non limitative indication—with reference to the attached drawing, whose only FIGURE shows a partly interrupted cross-section of a tire according to the invention.

DETAILED DESCRIPTION OF THE PREFERRED EMBODIMENTS

With reference to such FIGURE, a tire 1 conventionally comprises at least one carcass ply 2 whose opposite side edges are externally bent around bead wires 3, incorporated each in a bead 4, defined along an internal circumferential edge of the tire, wherein the tire itself engages on a wheel rim 5 of a vehicle.

Along the circumferential development of the carcass ply 2 a belt structure 12 is applied comprising one or more belt strips 6 made of textile or metal cords incorporated into a rubber sheet.

Externally to the carcass ply 2, in respective opposite side portion thereof, a couple of sidewalls 7 are applied, each of which extends from the bead 4 up to a so-called "shoulder" zone 8 of the tire, defined at the opposite ends of the belt structure 12.

Onto the belt structure 12 a tread 9 is circumferentially applied whose side edges end at the shoulders 8, joining with the sidewalls 7. The tread 9 has an external rolling surface 9a, suitable to get in touch with the ground, wherein circumferential grooves 10 may be obtained, spaced by transversal grooves, not shown in the attached FIGURE, which define a plurality of tread blocks 11 variously distributed along said rolling surface 9a.

The above described tire 1 may be manufactured by means of a process including a plurality of production steps, conventional in themselves and known in the art.

More particularly, such process comprises the steps of preliminarily and independently preparing several semi-finished products corresponding to the different parts of the tire (carcass plies, belt strips, bead wires, beads, fillings, sidewalls and treads) which are successively assembled with one another by a suitable assembling machine.

The subsequent vulcanization step then welds together the above semi-finished products to form a monolithic block, i.e. the tire.

Clearly, the step of preparing the above semi-finished products is preceded by a step of preparing and forming the corresponding rubber compositions.

In the tires of the invention, the tread 9 is produced by forming a vulcanizable rubber composition of the type described above.

The top capping or covering of a worn tire instead may be carried out, in a manner known per se, according to two different methods known as hot covering or cold covering.

In both cases, the worn tire is prepared by removing the tread up to the belt structure on which a suitable rubber composition sheet is applied.

In hot covering, the tread is made of crude rubber composition and is irreversibly linked to the belt structure in a suitably shaped vulcanization mold that has also the function of generating the desired tread pattern.

In cold covering, the tread is made of a rubber composition already vulcanized and already bearing the tread pattern, and is irreversibly linked to the belt structure in an autoclave.

In the following examples, solely given by way of non limitative indication, some formulations of rubber compositions and tires according to the invention and some comparative tests which both the tires of the invention and conventional tires have been subjected to, will now be provided.

The rubber compositions used were also analyzed in order to determine the content of the following ingredients:
a) extractable residue of the vulcanization accelerators;
b) activator;
c) combined sulfur.

More particularly, the following analysis methods were adopted:

a) high pressure chromatography (HPLC) according to the operating procedure described hereunder for the determination of the extractable residue of vulcanization accelerators;

b) analytical methods described in ISO 6001/1 standard for the determination of the activator;

c) combustion in oxygen according to the analytical methods described in ASTM D 297 standard for the determination of combined sulfur.

From the tests carried out, for all vulcanized rubber compositions of the invention, values of extractable residue of vulcanization accelerators, activator and combined sulfur were found that fall within the value intervals specified above.

Operating Procedure for the Determination of the Extractable Residue of an Accelerator Including at Least One 2-mercapto-benzothiazole Group In order to determine the extractable residue of an accelerator including at least one 2-mercapto-benzothiazole group by means of HPLC, the following methodology was followed.

In a first step, a reference standard solution was prepared by weighing, by means of an analytic balance having a precision of 0.1 mg, 100 mg of 2-mercapto-benzothiazole (MBT) transferred afterwards into a 1000 ml volumetric flask. Then, methanol was added up to volume and afterwards the MBT was dissolved by stirring the flask.

5 ml of the solution thus obtained were drawn and transferred into a 25 ml volumetric flask, where 5 ml of a solution of hexanthiol and pyperidine (previously prepared by mixing 14 ml of hexanthiol with 100 ml of pyperidine), and about 15 ml of methanol were added, so as to bring up to volume the resulting mixture.

The solution thus obtained, containing about 0.5 mg of MBT was used as a reference standard solution.

In the second step, a solution of the sample to be analyzed was prepared as follows.

From a sample of the vulcanized rubber composition to be analyzed—previously reduced to a thin sheet having a thickness of 0.5 mm, 100 mg (weighed by means of an analytic balance having a precision of 0.1 mg) were drawn, reduced afterwards to square pieces of 5×5 mm of side, and introduced into a 25 ml volumetric flask. After having introduced 5 ml of the solution of hexanthiol and pyperidine prepared as illustrated above (extraction solution), the flask was plugged and subjected to stirring at room temperature for about 48 hours, after which the mixture was again brought up to volume with methanol.

The flask was plugged again and stirred for a short time at room temperature and then let to rest for at least 2 hours.

The reference standard solution and the sample solution prepared in this way were analyzed by means of a chromatographic column for reverse-phase chromatography constituted by commercially available silica provided with an outer layer including $C_{18}$ alkyl groups and with an average size of the particles of about 5 μm.

The operating conditions of the column were the following:
injected volume: 2.5 μl
working T of the column: 40° C.
flow rate of the eluent: 0.25 ml/min
elution program:

| time (min) | eluent A (%) | eluent B (%) |
|---|---|---|
| 0 | 100 | 0 |
| 10 | 100 | 0 |
| 15 | 0 | 100 |
| 20 | 0 | 100 |
| 25 | 100 | 0 |
| 30 | 100 | 0 |

Eluent A: solution prepared by mixing 3.2 ml of 85% phosphoric acid, 400 ml of distilled water filtered at 0.22 μm and having a resistivity preferably greater than 10 MOhm*cm, and 600 ml of methanol for HPLC.

Eluent B: methanol solution for HPLC with 85% phosphoric acid, 3.2 ml in 1000 ml of methanol.

Measurements were made at 323 nm with 4 nm of passing band through a total of 3 chromatographic determinations for each solution (reference and sample).

The amount of extractable residue (% by weight) was calculated with she following formula:

$$MBT\% = [(P_t * H_c)/(P_c * H_t)] * 100$$

wherein:
$P_t$=mass in mg of MBT contained in the reference standard solution
$H_c$=mean of the peak areas obtained for the sample solution
$P_c$ =mass in mg of the sample
$H_t$=mean of the peak areas obtained for the reference standard solution

EXAMPLES 1–2

100% Silica Rubber Compositions

Rubber compositions having the composition shown in the following Table I were obtained by two mixing phases carried out by means of a rotor mixer known per se (Banbury) using a 70% filling factor. In the first step, all the ingredients except the vulcanizing system were loaded in the rotor mixer and mixed at 40 rpm for 4 minutes, keeping the temperature of the rubber composition at 160° C.

In the second step, carried out after having cooled the rubber composition obtained down to 23° C., the vulcanizing system was mixed to the other ingredients in the rotor mixer at 40 rpm for 4 minutes, taking care to keep the temperature of the rubber composition at a value of about 100° C. to avoid a premature triggering of vulcanization.

The following ingredients were used:
S-SBR=butadiene-styrene copolymer prepared in solution, having a styrene content equal to 20% by weight and a vinyl groups content equal to 60% by weight, available on the market under the trade name BUNA® VSL 5025/1 (BAYER);
BR=polybutadiene, available on the market under the trade name EUROPRENE® NEOCIS (ENICHEM);
NR=natural rubber available on the market under the technical designation TSR (Technically Specified Rubber) 20;
$SiO_2$=amorphous silica available on the market under the trade name Zeosil™ 1165 MP (Rhône-Poulenc);
TESPT=solid composition including 50% carbon black (N330), 50% bis(3-triethoxysilyl-propyl)tetrasulphide available on the market under the trade name X50S™ (Degussa);
aromatic oil=DAE (Distillate Aromatic Extract);
wax =composition of microcrystalline wax available on the market under the trade name ANTILUX™ 654 (BAYER);
vulcanizing system:
  stearic acid,
  ZnO obtained by indirect method (American type),
  6PPD=N-1,3-dimethylbutyl-N'-phenyl-p-phenylendiamine available on the market under the trade name VULKANOX™ 4020 (BAYER),
  DPG=diphenylguanidine available on the market under the trade name VULKACIT™ D (BAYER),
  MBTS=dibenzothiazyl disulphide available on the market under the trade name VULKACIT MERKAPTO™, (BAYER),
  CBS=N-cyclohexyl-2-benzothiazyl-sulphenamide available on the market under the trade name VULKACIT™ CZ (BAYER),
  S=sulfur.

The rubber composition of Example 1 (comparison) is a conventional rubber composition used for the manufacture of treads for vehicle tires, while the rubber composition of Example 2 is a rubber composition manufactured according to the present invention.

According to procedures conventional per se and known in the art, the above rubber compositions were submitted to vulcanization and then to a number of tests in order to evaluate some characteristic parameters of the vulcanized compositions. Such parameters may be considered as representative of the characteristics of a tire tread obtained with said compositions.

The parameters taken into consideration were the following:

TS2=time at 170° C. necessary to achieve an increase of two rheometric units measured by means of Monsanto rheometer model MDR 2000;

T90=time at 170° C. necessary to reach 90% of the final couple value measured by means of Monsanto rheometer model MDR 2000;

IRHD =International Rubber Hardness Degree measured according to DIN 53519 standard, part 1;

R. E.=% elastic yield measured by torsion pendulum (pendulum Zerbinii), according to ISO 4662 standard;

CA 1=traction force (referred to the section of the test piece), necessary to have a 100% strain, measured according to DIN 53504 standard;

CA 3=traction force (referred to the section of the test piece), necessary to have a 300% strain, measured according to DIN 53504 standard;

E' 0° C.=elasticity modulus measured at 0° C.;

E' 70° C.=elasticity modulus measured at 70° C.;

Tangδ 0° C.=ratio between the loss modulus (E") and the elasticity modulus (E') measured at 0° C.;

Tangδ 70° C.=ratio between the loss modulus (E") and the elasticity modulus (E') measured at 70° C.;

abraded volume=amount of rubber composition removed operating in the standard conditions specified in DIN 53516 standard;

ZnO=% by weight of the activator;

MBT=% by weight of the extractable residue of the accelerator;

C.S.=% by weight of combined sulfur;

C.S./MBT=weight ratio between the combined sulfur and the extractable residue of the vulcanization accelerator.

The values of E', E" and Tangδ were determined by using commercially available apparatuses of the company INSTRON, and submitting a cylindrical test-piece made of vulcanized rubber composition, having a length of 25 mm and a diameter of 14 mm, precompressed up to a longitudinal deformation of 25% of its original height and kept at the prefixed temperature (0° or 70° C.), to a dynamic sinusoidal deformation having a maximum width of ±3.50% of the height under preloading, with a frequency of 10 cycles per second (10 Hz).

For the purposes of the present invention, it is intended that all the mentioned values of E', E" and tangδ have been and should be measured according to the above described method.

The results of the tests carried out are reported in the following Table II. From the data reported in such table, it may be inferred that the vulcanized rubber composition of the invention (Example 2) achieves with respect to the comparative composition (Example 1) a marked improvement in terms of wear resistance (which may be related to the amount of removed rubber composition), against substantially similar performances in terms of wet skid resistance and rolling resistance (which may be related to the values of Tangδ at 0° C. and 70° C. respectively).

EXAMPLES 3–6

50% Silica/50% Carbon Black Rubber Compositions

Rubber compositions having the composition reported in the following Table III were obtained according to the procedure described in the preceding Examples 1–2.

The ingredients used were the same of the preceding Examples 1–2, except for the following:

C =carbon black N375, available on the market under the trade name VULCAN®J (CABOT CORPORATION);

TBBS=N-tert.butyl-2-benzothiazyl sulphenamide, available on the market under the trade name VULKACIT™ NZ (BAYER).

The rubber compositions of Examples 3 and 6 (comparison) are:

a conventional composition used for the manufacture of treads for vehicle tires (Example 3), and a rubber composition having an amount of extractable residue of the vulcanization accelerator lower than the aforementioned lower limit of 0.5 and also having a weight ratio between the combined sulfur and the extractable residue of the vulcanization accelerator above the aforementioned upper limit of 2.8 (Example 6).

The rubber compositions of Examples 4–5 are compositions manufactured according to the present invention.

According to procedures conventional per se and known in the art, the rubber compositions of Examples 3–6 were submitted to vulcanization and then to a number of tests in order to evaluate some characteristic parameters of the vulcanized compositions.

The parameters taken into consideration were the same of the preceding Examples 1–2.

The results of the tests carried out are reported in the following Table IV. From the data reported in such table, it may be inferred that the vulcanized rubber compositions of the invention (Example 4–5) achieve with respect to the comparative compositions (Examples 3 and 6) a marked improvement in terms of abrasion resistance (which may be related to the amount of removed rubber composition), against substantially similar performances in terms of wet skid resistance and rolling resistance (which may be related to the values of Tangδ at 0° C. and 70° C. respectively).

From the data reported in Table IV, it may also be inferred that if the amount Of extractable residue of the vulcanization accelerator present in the vulcanized rubber lies outside of the aforementioned range of 0.5–1.8, the performance of the tread in terms of abrasion resistance are unsatisfactory and remain comparable with that of the prior art even if the amount of the activator and that of combined sulfur lie within the ranges pointed out hereinabove.

EXAMPLES 7–8

100% Carbon Black Rubber Compositions

Rubber compositions having the composition reported in the following Table V were obtained according to the procedure described in the preceding Examples 1–2.

The ingredients used were the same of the preceding Examples 1–2, except for the following:

SBR 1500=EUROPRENE® 1500 (ENICHEM);

SBR 1712=EUROPRENE® 1712 (ENICHEM);

The rubber composition of Example 7 (comparison) is a conventional composition used for the manufacture of treads for vehicle tires, while the rubber composition of Example 8 is a composition manufactured according to the present invention.

According to procedures conventional per se and known in the art, the rubber compositions of Examples 7–8 were submitted to vulcanization and then to a number of tests in order to evaluate some characteristic parameters of the vulcanized compositions.

The parameters taken into consideration were the same of the preceding Examples 1–2.

The results of the tests carried out are reported in the following Table VI. From the data reported in such table, it can be inferred that the vulcanized rubber composition of the invention (Example 8) achieves with respect to the comparative composition (Example 7) a marked improvement in terms of abrasion resistance (which may be related to the amount of removed rubber composition), against substantially similar performances in terms of wet skid resistance and rolling resistance (which may be related to the values of Tangδ at 0° C. and 70° C. respectively).

EXAMPLES 9–12

Tires Including Silica and Carbon Black

A set of tires having the composition reported in the following Table VII were obtained by means of manufacturing operations conventional per se, using a polymeric base including:

S-SBR and BR (see the preceding Examples 1–2); or

BR (see the preceding Examples 1–2) and E-SBR=butadiene-styrene copolymer prepared in emulsion, having a styrene content equal to 23.5% by weight and an average content of vinyl groups equal to 17% by weight, available on the market under the trade name EUROPRENE® 1712 (ENICHEM).

The tires of Examples 9 and 11 (comparison) are of conventional type and were obtained using the ingredients and the amounts suggested by the prior art, while the tires of Examples 10 and 12 were manufactured according to the present invention.

The dimensions of the tires were the following: 195/65-15.

Such tires were then mounted on Lancia K cars having a displacement of 2400 cm$^3$ and submitted to a number of tests in order to determine the wear resistance.

In the present case, the test cars were driven through 20,000 km of a mixed course with full load, at the end of which the height reduction of the tread blocks, proportional to the rubber quantity worn off, was measured.

The tires were compared—the formulation of the polymeric base being equal—attributing a wear resistance index (RU index) equal to 100 for the tires of Examples 9 and 11 (comparison).

The evaluation of the tires obtained starting from the rubber compositions of Examples 10 and 12 (invention) involved a % variation of such index depending on the wear observed on the tested tires. In the present case, the higher is the value of the index, the greater was the height of the tread blocks after the course, i.e. the better was the wear resistance of the tread.

The results of the tests carried out are reported in the following Table VI.

As may be observed from the aforesaid table, the tires of the invention (Examples 10 and 12) achieved, with respect to the comparative tires (Examples 9 and 11) a marked improvement in terms of the wear resistance of the tread, represented by a corresponding increase in the corresponding index.

TABLE I (100% silica rubber compositions)

| Ingredients | Ex. 1 (comp.) | Ex. 2 (inv.) |
|---|---|---|
| S-SBR | 80 | 80 |
| BR | 33 | 33 |
| NR | 10 | 10 |
| SiO$_2$ | 70 | 70 |
| TESPT | 11.2 | 11.2 |
| aromatic oil | 5 | 5 |
| wax | 1 | 1 |
| stearic acid | 2 | 2 |
| ZnO | 2.5 | 1 |
| 6PPD | 2.5 | 2.5 |
| DPG | 1.92 | — |
| MBTS | — | 3 |
| CBS | 1.8 | — |
| sulfur | 1.4 | 1 |

TABLE II (100% silica rubber compositions)

| Properties | Ex. 1 (comp.) | Ex. 2 (inv.) |
|---|---|---|
| TS2 [min] | 1.06 | 0.84 |
| T90 [min] | 3.58 | 5.93 |
| IRHD | 74.4 | 73.8 |
| R.E. [%] | 47 | 43 |
| CA 1 [N/mm$^2$] | 2.32 | 2.20 |
| CA 3 [N/mm$^2$] | 10.13 | 8.17 |
| E' 0° C. [MPa] | 11.21 | 14.10 |
| E' 70° C. [MPa] | 6.43 | 7.40 |
| Tangδ 0° C. | 0.410 | 0.379 |
| Tangδ 70° C. | 0.136 | 0.151 |
| Abraded volume [mm$^3$] | 87 | 48 |
| ZnO [%] | 1.00 | 0.44 |
| MBT [%] | 0.33 | 0.69 |
| C.S. [%] | 1.52 | 1.60 |
| C.S./MBT | 4.61 | 2.32 |

TABLE III (50% silica/50% carbon black rubber compositions)

| Ingredients | Ex. 3 (comp.) | Ex. 4 (inv.) | Ex. 5 (inv.) | Ex. 6 (comp.) |
|---|---|---|---|---|
| S-SBR | 50 | 50 | 50 | 50 |
| BR | 20 | 20 | 20 | 20 |
| NR | 30 | 30 | 30 | 30 |
| CB (N375) | 30 | 30 | 30 | 30 |
| SiO$_2$ | 30 | 30 | 30 | 30 |
| TESPT | 4.8 | 4.8 | 4.8 | 4.8 |
| aromatic oil | 10 | 10 | 10 | 10 |
| wax | 1 | 1 | 1 | 1 |
| stearic acid | 2 | 2 | 2 | 2 |
| ZnO | 3 | 1 | 1 | 1 |
| 6PPD | 2.5 | 2.5 | 2.5 | 2.5 |
| DPG | 0.64 | — | — | — |
| MBTS | — | 3 | 1.4 | — |
| CBS | 1.4 | — | — | — |
| TBBS | — | — | 1.4 | 2.5 |
| sulfur | 2 | 1 | 1 | 1 |

TABLE IV (50% silica/50% carbon black rubber compositions)

| Properties | Ex. 3 (comp.) | Ex. 4 (inv.) | Ex. 5 (inv.) | Ex. 6 (comp.) |
|---|---|---|---|---|
| TS2 [min] | 1.27 | 1.23 | 1.73 | 1.21 |
| T90 [min] | 3.42 | 4.09 | 3.52 | 3.19 |
| IRHD | 72.5 | 73.0 | 71.6 | 72.1 |
| R.E. [%] | 40 | 37 | 38 | 37 |
| CA 1 [N/mm$^2$] | 2.78 | 2.28 | 2.28 | 2.26 |
| CA 3 [N/mm$^2$] | 10.87 | 8.39 | 8.46 | 8.34 |
| E' 0° C. [MPa] | 14.74 | 15.51 | 14.69 | 15.91 |
| E' 70° C. [MPa] | 6.54 | 6.31 | 6.06 | 6.30 |
| Tanδ 0° C. | 0.469 | 0.469 | 0.478 | 0.485 |
| Tanδ 70° C. | 0.142 | 0.166 | 0.163 | 0.172 |
| Abraded volume [mm$^3$] | 79 | 63 | 69 | 77 |
| ZnO [%] | 1.59 | 0.60 | 0.60 | 0.60 |
| MBT [%] | 0.17 | 0.82 | 0.63 | 0.44 |
| C.S. [%] | 1.86 | 1.60 | 1.60 | 1.42 |
| C.S./MBT | 10.9 | 1.95 | 2.54 | 3.23 |

TABLE V (100% carbon black rubber compositions)

| Ingredients | Ex. 7 (comp.) | Ex. 8 (inv.) |
|---|---|---|
| SBR 1500 | 27 | 27 |
| SBR 1712 | 73 | 73 |
| CB (N375) | 60 | 60 |
| aromatic oil | 7.5 | 7.5 |
| stearic acid | 2 | 2 |
| wax | 1.5 | 1.5 |
| ZnO | 2.5 | 1 |
| 6PPD | 1.5 | 1.5 |
| DPG | 0.2 | — |
| TBBS | 1.5 | 2.4 |
| sulfur | 1 | 1 |

TABLE VI (100% carbon black rubber compositions)

| Properties | Ex. 7 (comp.) | Ex. 8 (inv.) |
|---|---|---|
| TS2 [min] | 2.6 | 2.46 |
| T90 [min] | 5.27 | 4.20 |
| IRHD | 68 | 70.5 |
| R.E. [%] | 28.8 | 28.2 |
| CA 1 [N/mm$^2$] | 1.84 | 2.15 |
| CA 3 [N/mm$^2$] | 7.45 | 9.54 |
| E' 0° C. [MPa] | 18.87 | 19.88 |
| E' 70° C. [MPa] | 6.17 | 5.96 |
| Tanδ 0° C. | 0.542 | 0.543 |
| Tanδ 70° C. | 0.295 | 0.285 |
| Abraded volume [mm$^3$] | 83 | 66 |
| ZnO [%] | 1.54 | 0.60 |
| MBT [%] | 0.57 | 0.56 |
| C.S. [%] | 0.88 | 1.06 |
| C.S./MBT | 1.54 | 1.89 |

TABLE VII (rubber compositions comprising silica/carbon black)

| Ingredients | Ex. 9 (comp.) | Ex. 10 (inv.) | Ex. 11 (comp.) | Ex. 12 (inv.) |
|---|---|---|---|---|
| S-SBR | 75 | 75 | — | — |
| E-SBR | — | — | 80 | 80 |
| BR | 25 | 25 | 20 | 20 |
| CB | 35 | 35 | 45 | 45 |
| SiO$_2$ | 35 | 35 | 20 | 20 |
| ZnO | 3 | 1 | 3 | 1 |
| DPG | 0.64 | — | 0.4 | — |
| CBS | 1.4 | — | 1.4 | — |
| MBTS | — | 3 | — | 3 |
| sulfur | 2 | 1 | 2 | 1 |

TABLE VIII (tires comprising silica/carbon black)

| Properties | Ex. 9 (comp.) | Ex. 10 (inv.) | Ex. 11 (comp.) | Ex. 12 (inv.) |
|---|---|---|---|---|
| RU INDEX | 100 | 133 | 100 | 120 |

RU index = wear resistance index (high is better)

The invention claimed is:

1. A tire for a vehicle wheel, comprising a tread comprising a vulcanized polymeric base including:
   at least one reinforcing filler dispersed in the polymeric base;
   an amount of extractable residue of at least one vulcanization accelerator, containing at least one carbon atom bound to at least two sulfur atoms, greater than or equal to 0.5% and less than or equal to 1.8% by weight based on a total weight of the tread;
   an effective amount of at least one activator, expressed as equivalents of zinc oxide, less than or equal to 0.6% by weight based on the total weight of the tread; and
   an amount of combined sulfur less than or equal to 2.5% by weight based on the total weight of the tread.

2. The tire of claim 1, wherein the polymeric base is obtained starting from at least one polymer selected from the group comprising: natural rubber; polybutadiene; polychloroprene; polyisoprene; optionally halogenated isoprene-isobutene copolymers; butadiene-acrylonitrile copolymers; copolymers obtainable by polymerization of at least one conjugated diene with at least one vinyl aromatic hydrocarbon; optionally halogenated isobutylene/p-methyl styrene copolymers; styrene-butadiene-isoprene terpolymers, obtained either in solution or in emulsion; ethylene-propylene-diene terpolymers; and mixtures thereof.

3. The tire of claim 1, wherein the at least one vulcanization accelerator is selected from accelerators including at least one 2-benzothiazole or sulphenamide group.

4. The tire of claim 3, wherein the at least one vulcanization accelerator has a following structural formula:

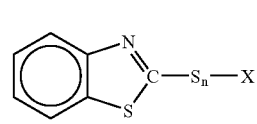

(I)

wherein n is an integer from 1 to 5 and X is H or a group selected from:

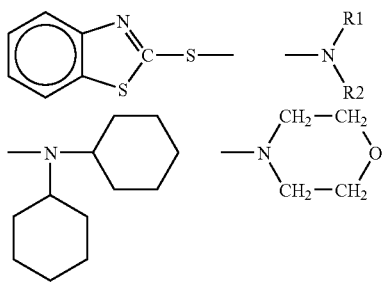

wherein R1 and R2 are independently H; an alkyl group; a saturated ring optionally comprising C, S, or O; a cycloalkyl group having 5 or 6 carbon atoms; or a group

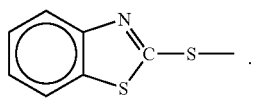

5. The tire of claim 3, wherein the at least one vulcanization accelerator is selected from the group comprising: 2-mercaptobenzothiazole (MBT), dibenzothiazyl disulphide (MBTS), N-cyclohexyl-2-benzothiazyl-sulphenamide (CBS), N-tert.butyl-2-benzothiazyl sulphenamide (TBBS), 2-morpholinthia-2-benzothiazole (MBS), N-dicyclohexyl-2-benzothiazyl sulphenamide (DCBS), benzothiazyl-2-diisopropyl sulphenamide (DIBS), benzothiazyl-2-tert.amyl sulphenamide (AMZ), morpholine-thiocarbonyl sulphenmorpholine (OTOS), N-tert.butyl-2-benzothiazol sulphenamide (TBSI), and mixtures thereof.

6. The tire of claim 3, wherein a weight ratio of the amount of extractable residue of the at least one vulcanization accelerator to the amount of the at least one activator, expressed in terms of zinc oxide equivalents, is less than or equal to 10:1.

7. The tire of claim 1, wherein a weight ratio of the amount of combined sulfur to the amount of extractable residue of the at least one vulcanization accelerator is greater than or equal to 1.2:1 and less than or equal to 2.8:1.

8. The tire of claim 1, wherein the at least one activator is selected from the group comprising: oxygenated compounds of a metal selected from Zn, Bi, or Pb; salts formed between the metal and a fatty acid, either saturated or unsaturated, having from 8 to 18 carbon atoms; and mixtures thereof.

9. The tire of claim 1, wherein the at least one reinforcing filler comprises carbon black, silica, or carbon black and silica.

10. The tire of claim 9, wherein the at least one reinforcing filler comprises greater than or equal to 0 phr and less than or equal to 100 phr of carbon black and greater than or equal to 0 phr and less than or equal to 100 phr of silica.

11. A tread for a vehicle tire, comprising a vulcanized polymeric base including:
at least one reinforcing filler dispersed in the polymeric base;
an amount of extractable residue of at least one vulcanization accelerator, containing at least one carbon atom bound to at least two sulfur atoms, greater than or equal to 0.5% and less than or equal to 1.8% by weight based on a total weight of the tread;

an effective amount of at least one activator, expressed as equivalents of zinc oxide, less than or equal to 0.6% by weight based on the total weight of the tread; and
an amount of combined sulfur less than or equal to 2.5% by weight based on the total weight of the tread.

12. The tread of claim 11, wherein the at least one vulcanization accelerator is selected from accelerators including at least one 2-benzothiazole or sulphenamide group.

13. The tread of claim 12, wherein the at least one vulcanization accelerator has a following structural formula:

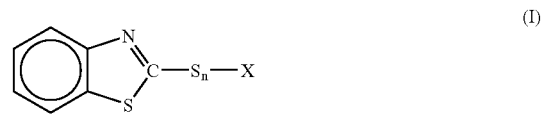 (I)

wherein n is an integer from 1 to 5 and X is H or a group selected from:

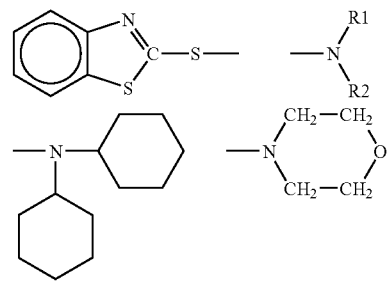

wherein R1 and R2 are independently H; an alkyl group; a saturated ring optionally comprising C, S, or O; a cycloalkyl group having 5 or 6 carbon atoms; or a group

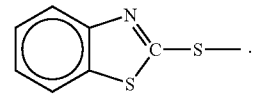

14. The tread of claim 11, wherein a weight ratio of the amount of extractable residue of the at least one vulcanization accelerator to the amount of the at least one activator, expressed in terms of zinc oxide equivalents, is less than or equal to 10:1.

15. The tread of claim 11, wherein a weight ratio of the amount of combined sulfur to the amount of extractable residue of the at least one vulcanization accelerator is greater than or equal to 1.2:1 and less than or equal to 2.8:1.

16. The tread of claim 11, wherein the at least one activator is selected from the group comprising: oxygenated compounds of a metal selected from Zn, Bi, or Pb; salts formed between the metal and a fatty acid, either saturated or unsaturated, having from 8 to 18 carbon atoms; and mixtures thereof.

17. The tread of claim 11, wherein the at least one reinforcing filler comprises carbon black, silica, or carbon black and silica.

18. A process for manufacturing a tire for vehicle wheels, comprising the steps of preparing, around a circumference of a belt structure, a tread of claim 11, and linking, by vulcanization, the tread to the belt structure.

19. A process for covering a worn tire for vehicle wheels, comprising the steps of preparing, around a circumference of a belt structure, a tread of claim 11, and irreversibly linking the tread to the belt structure.

20. A method for increasing wear resistance of a tire, the tire being provided with at least one carcass ply on which a belt structure is circumferentially applied, and with a tread circumferentially applied around the belt structure and externally provided with a rolling surface suitable to get in touch with the ground, wherein the tire is provided with a tread of claim 11.

\* \* \* \* \*